United States Patent
Romo

[11] Patent Number: 5,808,205
[45] Date of Patent: Sep. 15, 1998

[54] ECCENTRIC CAPACITIVE PRESSURE SENSOR

[75] Inventor: Mark G. Romo, Eden Prairie, Minn.

[73] Assignee: Rosemount Inc., Eden Prairie, Minn.

[21] Appl. No.: 831,355

[22] Filed: Apr. 1, 1997

[51] Int. Cl.[6] .................................................. G01L 9/12
[52] U.S. Cl. .......................................................... 73/718
[58] Field of Search .......................... 73/718, 724, 756; 361/283.4

[56] References Cited

U.S. PATENT DOCUMENTS

| | | | |
|---|---|---|---|
| 3,405,559 | 10/1968 | Moffatt | 73/724 |
| 3,587,322 | 6/1971 | Lobdell et al. | 73/756 |
| 3,743,552 | 7/1973 | Fa | 148/175 |
| 3,750,476 | 8/1973 | Brown | 73/724 |
| 4,064,549 | 12/1977 | Cretzler | 361/283 |
| 4,084,438 | 4/1978 | Lee et al. | 73/706 |
| 4,088,799 | 5/1978 | Kurtin | 427/38 |
| 4,196,632 | 4/1980 | Sikorra | 73/718 |
| 4,287,501 | 9/1981 | Tominaga et al. | 338/42 |
| 4,301,492 | 11/1981 | Paquin et al. | 361/283 |
| 4,414,851 | 11/1983 | Maglic | 73/756 X |
| 4,487,057 | 12/1984 | Lutz | 73/724 X |
| 4,507,973 | 4/1985 | Barr et al. | 73/724 |
| 4,538,466 | 9/1985 | Kerber | 73/724 |
| 4,542,436 | 9/1985 | Carusillo | 361/283 |
| 4,753,109 | 6/1988 | Zabler | 73/115 |
| 4,772,983 | 9/1988 | Kerber et al. | 361/283 |
| 4,800,758 | 1/1989 | Knecht et al. | 73/727 |
| 4,967,600 | 11/1990 | Keller | 73/727 |
| 4,970,898 | 11/1990 | Walish et al. | 73/756 X |
| 4,972,717 | 11/1990 | Southworth et al. | 73/724 |
| 4,993,267 | 2/1991 | Allard et al. | 73/756 X |
| 5,014,557 | 5/1991 | Lawless | 73/756 |
| 5,155,061 | 10/1992 | O'Connor et al. | 437/86 |
| 5,178,015 | 1/1993 | Loeppert et al. | 73/718 |
| 5,201,228 | 4/1993 | Kojima et al. | 73/724 |
| 5,212,989 | 5/1993 | Kodama et al. | 73/756 X |
| 5,227,068 | 7/1993 | Runyon | 210/610 |
| 5,231,880 | 8/1993 | Ward et al. | 73/702 |
| 5,287,746 | 2/1994 | Broden | 73/706 |
| 5,326,726 | 7/1994 | Tsang et al. | 437/228 |
| 5,332,469 | 7/1994 | Mastrangelo | 156/643 |
| 5,349,492 | 9/1994 | Kimura et al. | 361/283.4 |
| 5,353,643 | 10/1994 | Glaser | 73/724 |
| 5,381,300 | 1/1995 | Thomas et al. | 361/280 |
| 5,437,189 | 8/1995 | Brown et al. | 73/721 |
| 5,471,884 | 12/1995 | Czarnocki et al. | 73/720 |

FOREIGN PATENT DOCUMENTS

| | | |
|---|---|---|
| 0 351 701 B1 | 7/1989 | European Pat. Off. . |
| 3404262 A1 | 9/1984 | Germany . |
| 4938911 | 4/1974 | Japan . |
| 62-259475 | 11/1987 | Japan . |
| 63-285195 | 11/1988 | Japan . |
| 91-311556 | 4/1990 | Japan . |
| 6-300650 | 10/1994 | Japan . |
| 1069435 | 8/1964 | United Kingdom . |

OTHER PUBLICATIONS

"Phase Formation Study in $\alpha$–$Al_2O_3$ Implanted With Niobium Ions", by L. Romana et al., *Nuclear Instruments and Methods in Physics Research B46*, published by Elsevier Science Publishers B.V. (North–Holland), pp. 94–97 (1990).

"Surface Electrical Properties of Ni–implanted Sapphire", by L. Shipu et al., Processing of *Advanced Materials*, published by Chapman & Hall, pp. 77–80 (1991).

(List continued on next page.)

*Primary Examiner*—George Dombroske
*Assistant Examiner*—Paul D. Amrozowicz
*Attorney, Agent, or Firm*—Westman, Champlin & Kelly, P.A.

[57] ABSTRACT

An elongated pressure sensor includes an inner bar carried within an elongated hollow member. A gap formed between the bar and elongated hollow member changes shape in response to a pressure applied to the elongated hollow member. Capacitive electrodes on the elongated hollow member and bar have a capacitance which changes in response to applied pressure. The sensor is adapted for coupling to a multifunction body.

17 Claims, 7 Drawing Sheets

OTHER PUBLICATIONS

"Creep of Sensor's Elastic Elements: Metals Versus Non–metals", by K. Bethe et al., *Nova Sensor —Silicon Sensors and Microstructures,* 1990, pp. 844–849.

"Silicon Sensors and Microstructures," by J. Brysek et al., *Nova Sensor,*Jun. 1990, pp. 5.4–5.8, 8.21–8.23, 9.9–9.10, 9.13–9.15.

"A Balanced Resonant Pressure Sensor", by E. Stemme et al., *Sensors and Actuators,* A21–A23, 1990, pp. 336–341.

"Fabrication of an Implantable Capacitive Type Pressure Sensor", by S. Shoji et al., *Transducers '87,* 1987.

"Silicon–to–Silicon Direct Bonding Method", by M. Shimbo et al., *J. Appl. Phys.,* vol. 60, No. 8, Oct. 15, 1986, pp. 2987–2989.

"Low–Temperature Preparation of Silicon/Silicon Interfaces by the Silicon–to–Silicon Direct Bonding Method", by S. Bengtsson et al., *J. Electrochem. Soc.,* vol. 137, No. 7, Jul. 1990, pp. 2297–2303.

"Interface Charge Control of Directly Bonded Silicon Structures", by S. Bengtsson et al., *J. Appl. Phys.,* vol. 66, No. 3, Aug. 1, 1989, pp. 1231–1239.

"Wafer Bonding for Silicon–on–Insulator Technologies", by J.B. Lasky, *Appl. Phys Lett.,* vol. 48, No. 1, Jan. 1, 1986, pp. 78–80.

"Small Sensitive Pressure Transducer for Use at Low Temperatures", by W. Griffioen et al., *Rev. Sci. Instrum.,* vol. 56, No. 6, Jun. 1985, pp. 1236–1238.

"High–Temperature Healing of Lithographically Introduced Cracks in Sapphire", by J. Rödel et al., *J. Am. Ceram. Soc.,* vol. 73, No. 3, Mar. 1990, pp. 592–601.

"Production of Controlled–Morphology Pore Arrays: Implications and Opportunities", by J. Rödel et al., *J. Am. Ceram. Soc.,* vol. 70, No. 8, Aug. 1987, pp. C–172–C–175.

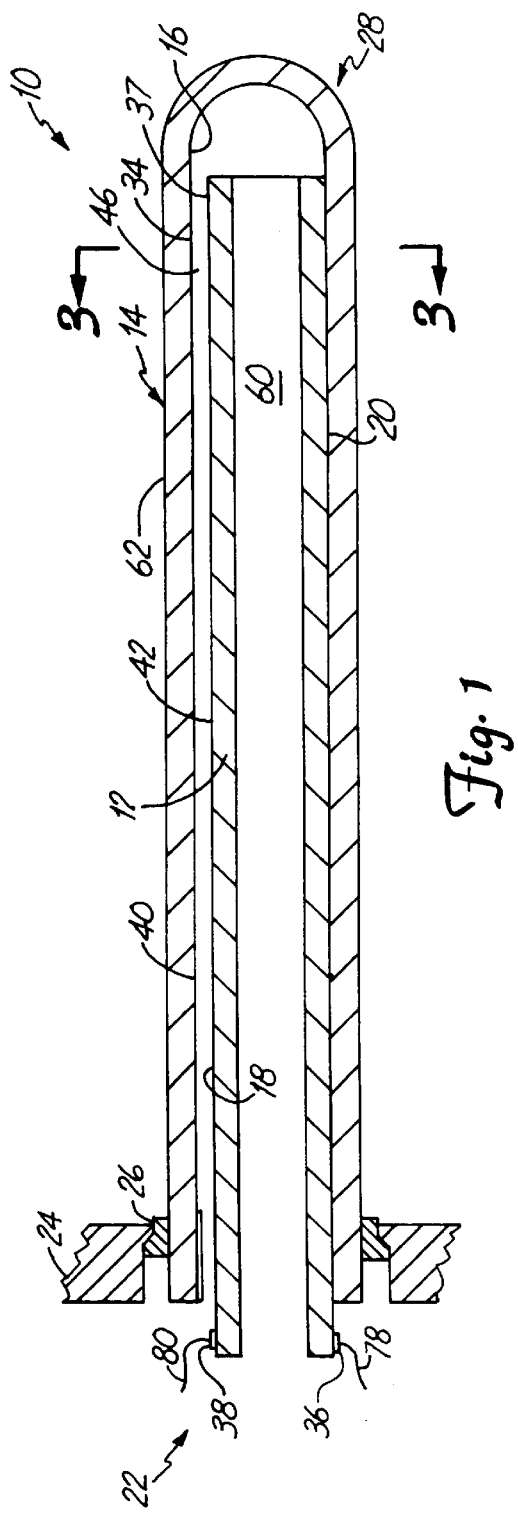
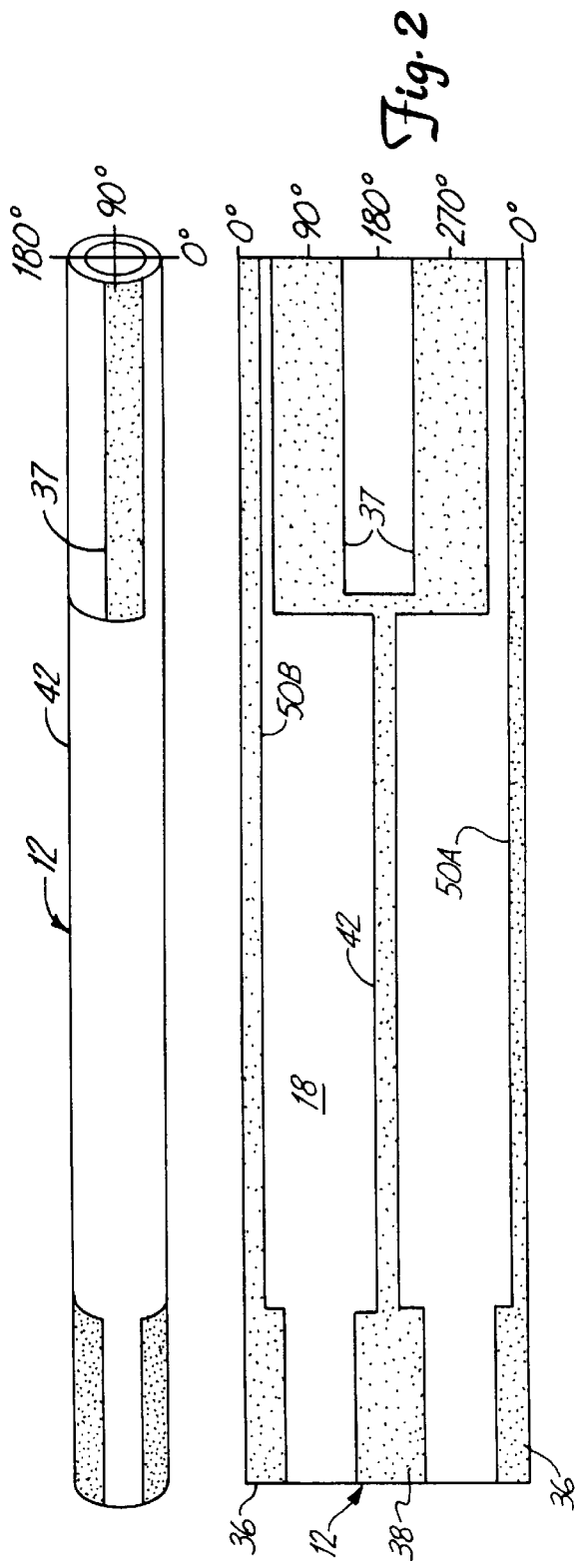

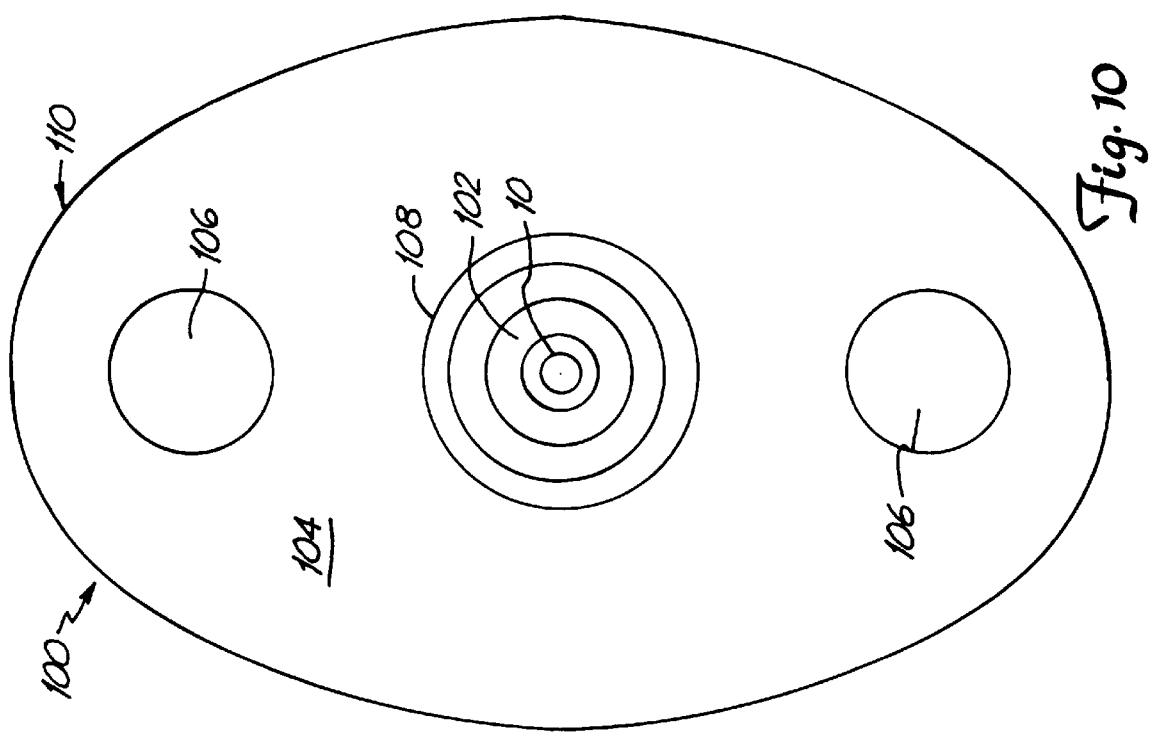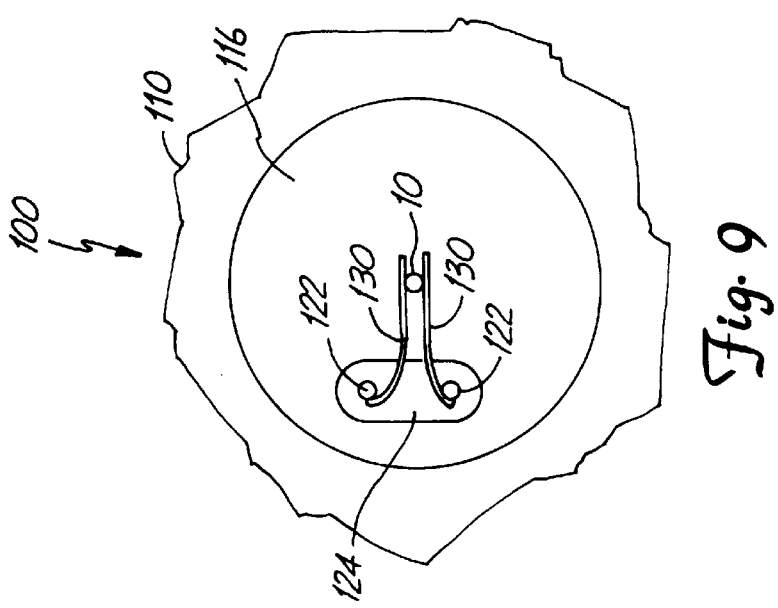

5,808,205

ECCENTRIC CAPACITIVE PRESSURE SENSOR

BACKGROUND OF THE INVENTION

This invention relates to cylindrical capacitive pressure sensors.

Capacitive Pressure Sensors with a outer cylindrical surface which is compressed by pressure in order to vary an electrical capacitance inside the cylinder are known from U.S. Pat. No. 4,772,983 Kerber et al., "Method and Article for a Nearly Zero Temperature Coefficient Pressure Transducer" and U.S. Pat. No. 4,064,549 Cretzler, "Cylindrical Capacitive Quartz Transducer."

In these known sensors, an inner rod or cylinder is placed concentrically inside the outer cylinder, forming an annular gap between the two components along the length of the cylinder which varies as a function of pressure. The arrangement is desirable because it provides a means of isolating the sensing part of the probe from mounting stress. In these known sensors, however, the mounting for the inner rod or cylinder is placed at one or both ends of the outer cylinder, leaving the mass of the inner component suspended along the length of the elongated hollow member.

Under conditions of vibration or mechanical shock, this suspended mass is free to move relative to the outer cylinder. There is a desire to maintain a very narrow gap between the inner and outer components to provide a high value of variable capacitance for sensing. As this gap is reduced in size, however, manufacture of the probe can become increasingly difficult because better concentric alignment is needed as the gap gets reduced. Also, as this annular gap is reduced in size to obtain the desired increase in electrical capacitance, the potential for the suspended mass to strike the outer cylinder under conditions of vibration increases undesirably. When the inner component strikes the outer component, the probe can malfunction or crack due to fretting erosion or cracking. This is particularly problematic when the sensor is used in harsh environments, such as industrial process control.

There is thus a need for an improved cylindrical capacitive pressure sensor with reduced sensitivity to shock and vibration.

SUMMARY OF THE INVENTION

The present invention includes a capacitive pressure sensor having an elongated hollow member formed of an electrically insulating material extending from an open end for receiving electrical connections to a sealed end. The elongated hollow member includes an elongated hollow member inner wall along its length which is deflectable by pressure. A bar formed of an electrically insulating material extends inside the elongated hollow member and includes an outer wall which is attached to the elongated hollow member inner wall. First and second capacitive electrodes are carried on the elongated hollow member inner wall and the bar outer wall and first and second electrical paths extend between the first and second electrodes, respectively, and the open end of the elongated hollow member. The elongated hollow member inner wall and the bar outer wall have shapes which form a gap between the first and second capacitive electrodes having a spacing which changes with pressure. The deflection varies the electrical capacitance between the first and second capacitive electrodes whereby the pressure may be detected.

Another aspect of the invention includes a pressure sensing module in which an elongated hollow member shaped pressure sensor includes a process pressure sensing end that is sealed and further includes an opposite, reference pressure sensing end that is open providing an electrical pressure sensor signal. A sealed electrical feedthrough electrically connects to the sensor and feeds the pressure sensor signal outside of the pressure sensing module. A multi-function body includes a chamber which is sealed by the electrical feedthrough and provides a reference pressure to the open sensor end.

BRIEF DESCRIPTION OF THE DRAWINGS

FIG. 1 shows a longitudinal cross section of a pressure sensor with a bar in an elongated hollow member.

FIG. 2 shows film conductors on a bar for a pressure sensor.

FIG. 9 shows an electrical feedthrough and flag connection for the module body shown in FIG. 8.

FIG. 10 shows a side view of the module body shown in FIG. 8.

DETAILED DESCRIPTION OF THE PREFERRED EMBODIMENTS

Figure 3:
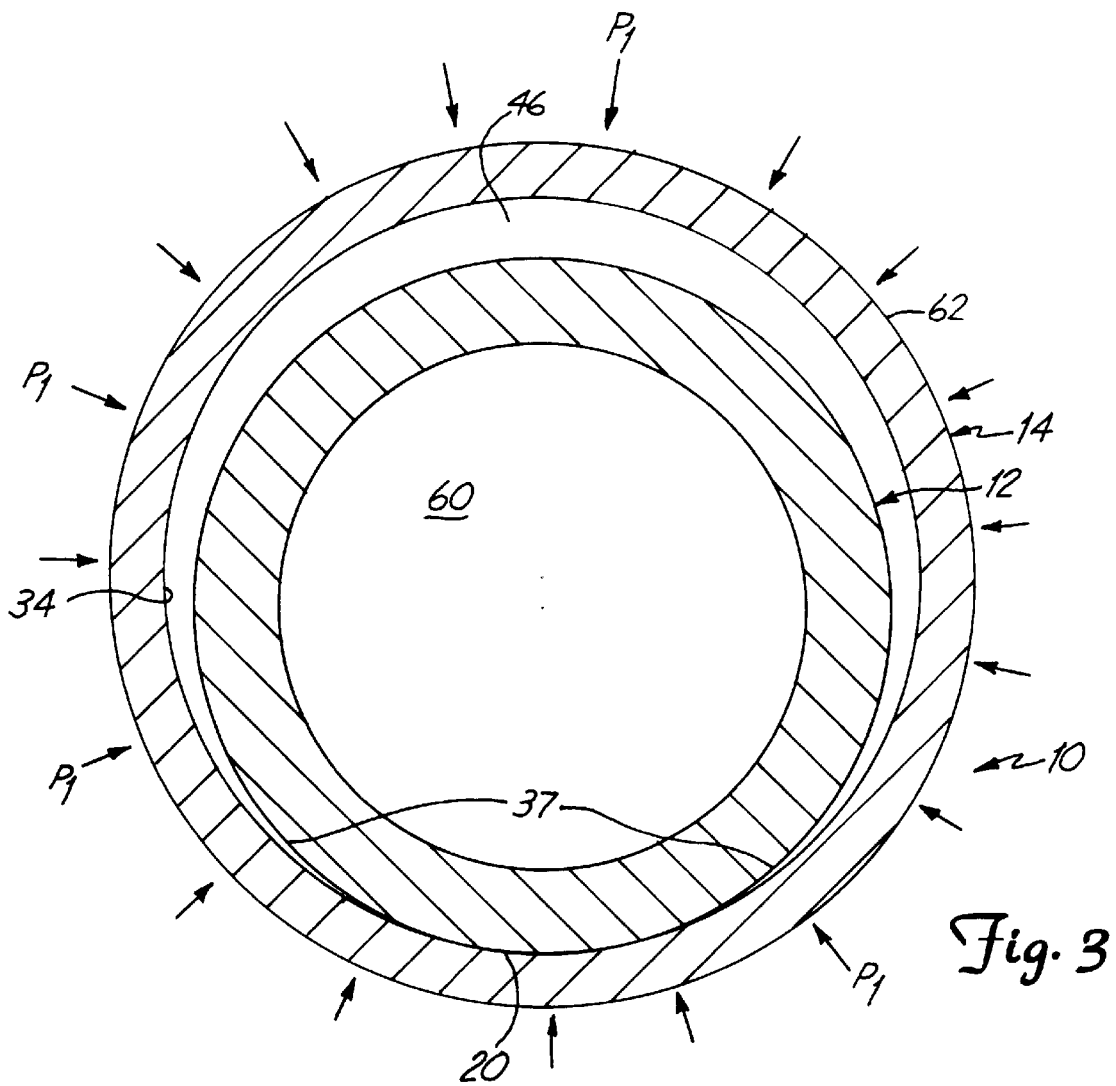
FIG. 3 shows a transverse cross section of a pressure sensor with a bar in an elongated hollow member.

The present invention provides a new pressure sensor having an elongated shape. The structure provides stress isolation to thereby improve sensor accuracy and is also less susceptible to damage through vibrations or mechanical shock than typical prior art designs. Further, the device is easy to manufacture. The instant disclosure describes various pressure sensors and embodiments in accordance with the invention. For simplicity, related elements are identified using the same reference numerals.

FIG. 1 is a longitudinal cross-section of pressure sensor 10 in accordance with one embodiment which includes elongated bar 12 carried in elongated hollow member 14. Bond 20 bonds elongated hollow member inner wall 16 of elongated hollow member 14 to bar outer wall 18. Elongated hollow member 14 includes an open end coupled to mount 24 at joint 26 and an opposing closed end 28. Inner wall 16 and outer wall 18 carry first and second capacitive electrodes 34 and 37, respectively, which connect to first contact 36 and second contact 38 through first electrical path 40 and second electrical path 42, respectively. Bar 12 and elongated hollow member 14 are of size and shape to form gap 46 therebetween.

FIG. 2 is a perspective and flattened view of bar 12 showing conductive paths 42 and 50A, 50B. Paths 50A and 50B electrically couple to path 40 of elongated hollow member 14 along bond 20 shown in FIG. 1. As further illustration, FIG. 3 is a transverse cross-sectional view of pressure sensor 10 showing gap 46 and bar inner cavity 60.

Pressure $P_1$ applied to outer surface 62 of elongated hollow member 14 causes deformation of elongated hollow member 14. This deformation causes the size of gap 46 to change whereby spacing between electrodes 34 and 37 changes causing a resultant capacitance change. The change in capacitance is detected by appropriate detection circuitry (not shown in FIGS. 1–3) for use as a measurement of applied pressure $P_1$.

Figure 4:
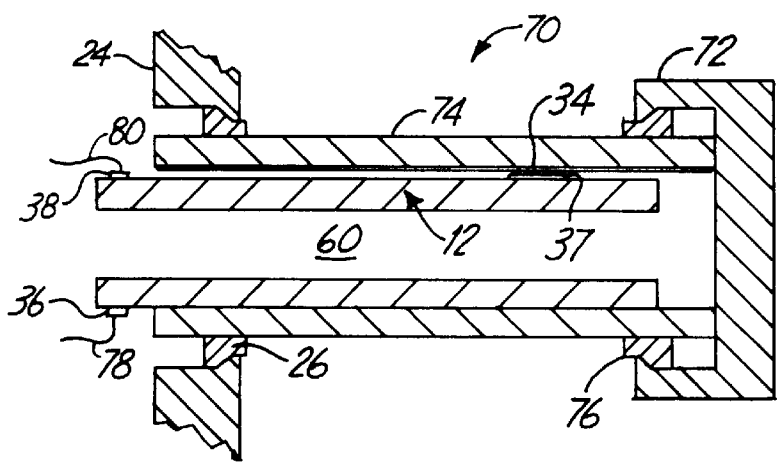
FIG. 4 shows a longitudinal cross section of a pressure sensor with an elongated hollow member end cap.

FIG. 4 is a longitudinal cross-sectional view of pressure sensor 70 having elongated hollow member end cap 72 in accordance with another embodiment. Sensor 70 is similar to sensor 10 and reference numerals have been maintained for similar elements. Sensor 70 includes elongated hollow member 74 which is sealed by elongated hollow member end cap 72 at seal 76. Conductors 78 and 80 connect to contacts 36 and 38, respectively. Sensor 70 does not require the sealed elongated hollow member 14 of sensor 10. If end cap 72 is mounted, it provides additional support for sensor 70. However, this may also lead to increased stress and the associated inaccuracies.

Figure 5:
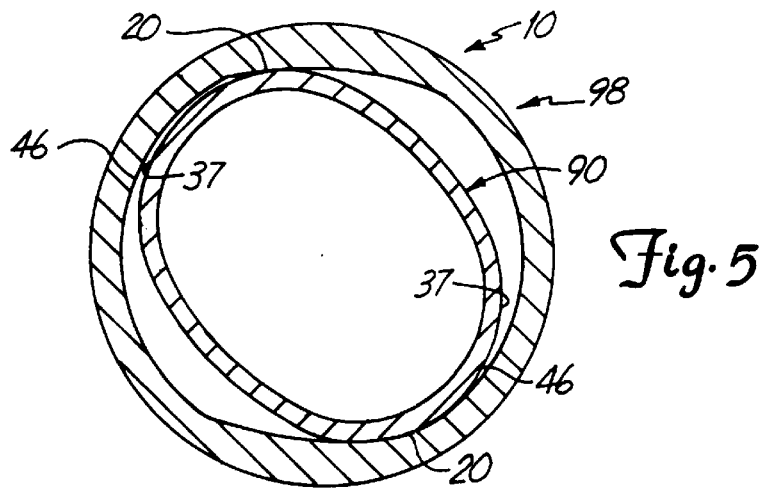
FIG. 5, 6 and 7 show transverse cross sections of three alternative embodiments of a pressure sensor.
Figure 6:
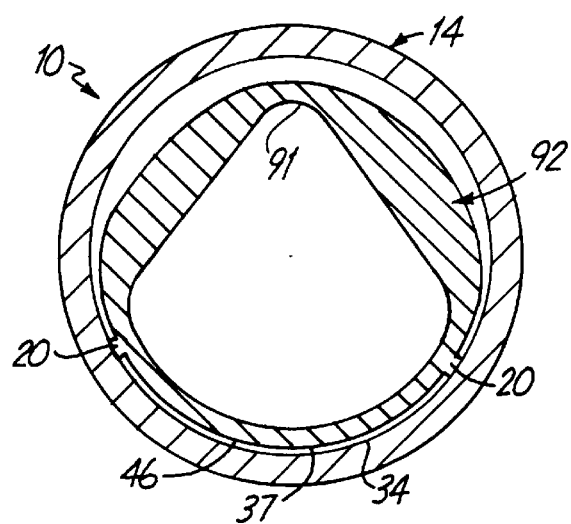
Figure 7:
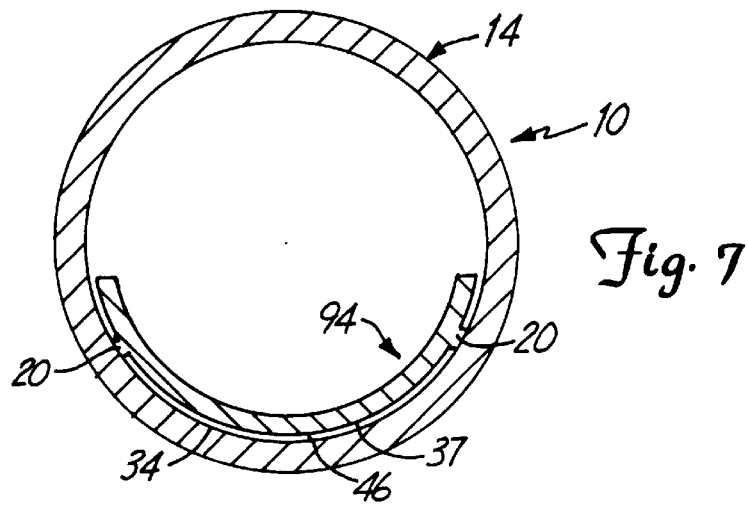

In the embodiments set forth herein, bar 12 may be selected as a solid elongated member or as a hollow member to provide reduced mass and reduced sensitivity to vibration. Preferably, bar 12 and elongated hollow member 14 have length-wise surfaces which are generally parallel, non-tapering surfaces and have cross-sections which are round, oval, elliptical, square, rectangular, or other simple or complex tubular shapes as desired. However, surfaces tapering in either direction may be used, for example, to achieve desired sensor characteristics. Further, the sensor cross section may change along its length and need not be parallel. For example, FIGS. 5, 6 and 7 are transverse cross-sectional views of bars having elliptical (90), curved (92), and semi-circular (94) shapes, respectively, carried in elongated hollow member 14. Further, the elongated hollow member may have any desired shape such as elongated hollow member 98 shown in FIG. 5. The different shapes for outer members can make stress/strain concentrations which can provide greater movement of the preferred electrode area on the member. Multiple bond lines can enable movement on portions of the bar to also give larger signal. Preferably electrode areas of the bar also move. For example, in FIG. 5, member 98 has regions of reduced thickness to promote deformation and therefore change in capacitance when exposed to pressure. In FIG. 6, bar 92 includes a hinge portion 91 which promotes deformation thereabout to promote change in the size of gap 46.

A reference pressure or a vacuum may be applied to gap 46 at open end 22 of elongated hollow member 14 to sense a gauge or absolute pressure, respectively, as desired. Preferably, bar 12 and elongated hollow member 14 are formed of brittle materials having low mechanical hysteresis such as quartz, sapphire, or the like, and which have dielectric or electrical insulating properties. Additionally, fabrication of the bar and/or elongated hollow member may be through crystal growth techniques, machining, or other applicable techniques. The conductive materials for the pathways and capacitive electrodes are preferably thin films formed of tantalum, tungsten, and the like, which are stable after deposition on the brittle materials and can take high temperature for assembly steps. Semiconductor materials may also be used as conductors. In one embodiment, attachment of bar 12 to inner wall 16 of elongated hollow member 14 is accomplished by assembling bar 12 and elongated hollow member 14 and raising the temperature of the assembly to bond the conductive films on bar 12 and elongated hollow member 14 together by fusion bonding.

For example, if the conductor is a metallization of tantalum, sensor 10 may be raised to an appropriate temperature causing the metallizations to join. Variations include the use of a solder or braze to join the materials to thereby allow processing at different temperatures. Preferred conductors include Mo, Ta, Ti, W, and Rh.

Figure 8:
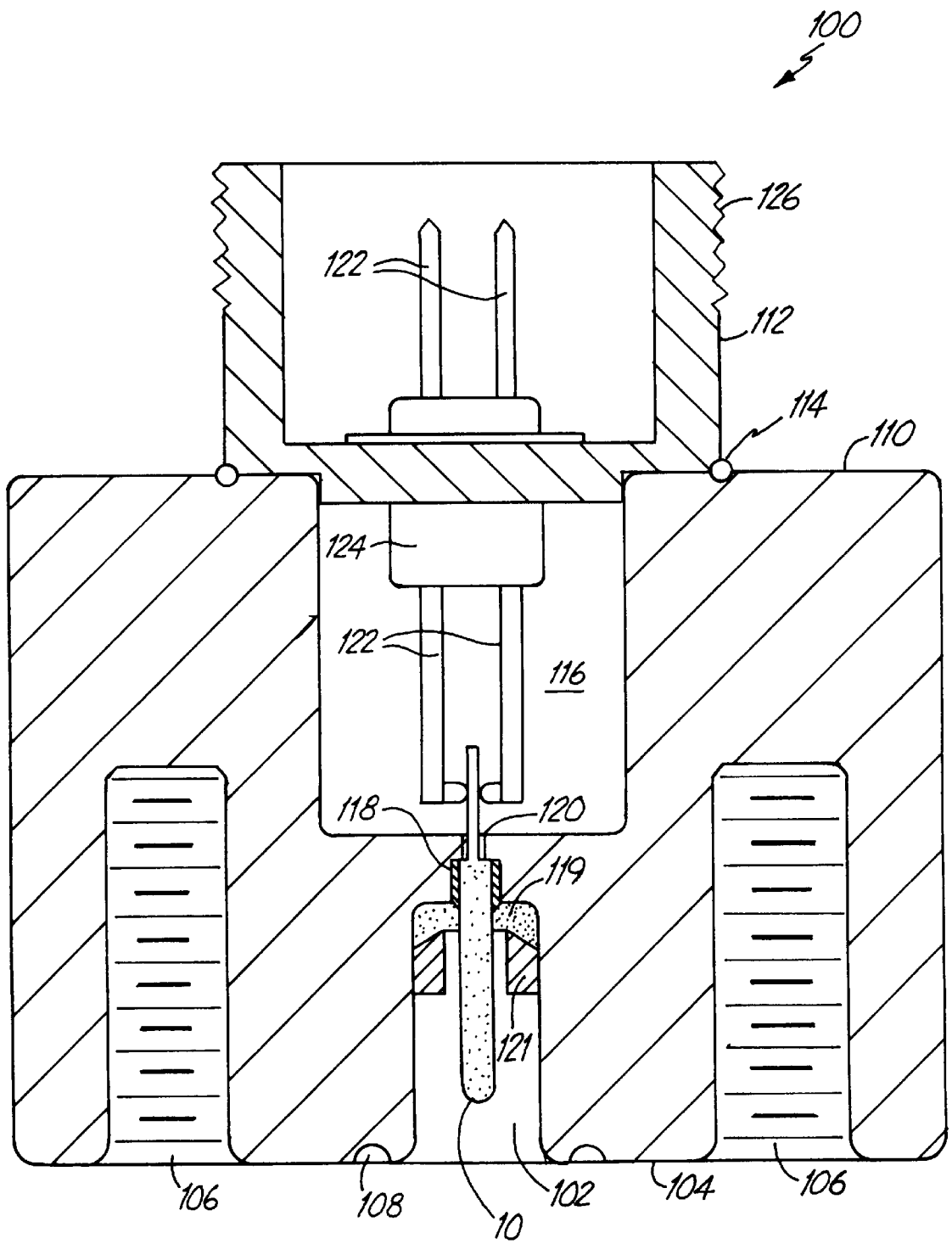
FIG. 8 shows a cross section of a pressure sensor arranged in a multi-function body providing electrical connections, reference pressure, sealing and connection for a process fluid connection.

FIG. 8 is a cross-sectional view of pressure sensor 10 arranged in a multifunction body 100. Body 100 includes sensor cavity 102 formed in process coupling face 104 having bolt holes 106 and gasket depression 108 formed therein. Body 100 includes main body 110 mounted to coupling 112 by braze joint 114. Main body 110 includes reference pressure cavity 116 formed therein for applying a reference pressure to sensor 10. Sensor 10 is mounted to main body 110 through bond 118 which also provides isolation of sensor 10. The joining and sealing of sensor 10 to body 110 may be through brazing, soldering or other appropriate means. For particularly corrosive process fluids, an additional teflon seal can be added. For example, a teflon ring 119 may be pushed into the bottom of cavity 102 and compressed using retaining ring 121. Conductors extend from sensor 10 through opening 120 which is also used to apply the reference pressure cavity 116 to sensor 10. Elongated conductors 122 couple to conductors 36, 38 on bar 12 extend into cavity 116 and extend through electrical feedthrough 124 and coupling 112 and are adapted to be coupled to an external circuitry, for example, using a plug. Preferably, electrical feedthrough 124 comprises a dielectric which serves to seal and support conductors 122. Typically, body 100 screws into an electronics housing at threads 126 and conductors 122 coupled to electronics in the electronics housing. The electronics convert the capacitance of sensor 10 into a signal which can be conveniently transmitted over distances such as a two-wire 4–20 mA circuit which is also used to energize the circuit. Additionally, the output may be provided in a digital format, for example in accordance with HART® or Fieldbus® industry standards.

FIG. 9 is a top cross-sectional view showing electrical feedthrough 124 in greater detail. Conductors 122 coupled to flag connectors 130 which make electrical connections to contacts (not shown in FIG. 9) on sensor 10.

FIG. 10 is a bottom plan view of main body 110 showing face 104. FIG. 10 shows sensor 10 carried in cavity 102. Bolt holes 106 are positioned such that face 104 may be coupled to a process connection and sealed using a gasket in depression 108. Face 104 is adapted to be mounted to an industry standard flange adaptor union or manifold using bolt holes 106. Body 110 may be expanded to include two spaced apart sensors 10 carried in cavities 102 whereby two pressures may be sensed. For example, in such an embodiment, body 110 may be connected to two industry standard adaptor unions. The two sensors may share the same cavity 116 such that they couple to the same reference pressure and a multi-pin feedthrough may be used with any desired number of contacts.

Figure 11:
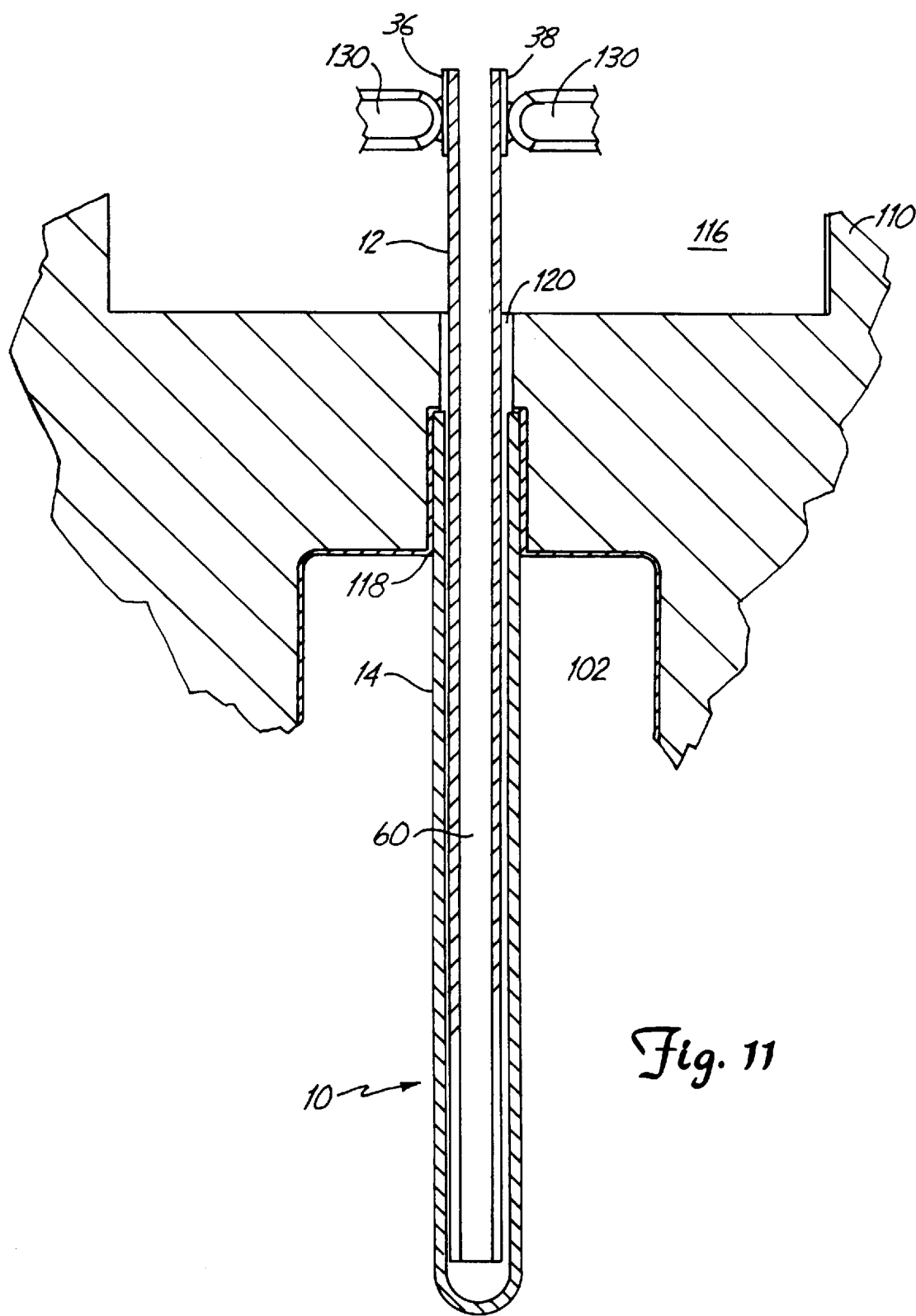
FIG. 11 shows an enlarged view on an embodiment of sensor mounting for the module body shown in FIG. 8.

FIG. 11 is a large cut away view showing sensor 10 coupled to main body 110. In FIG. 11, bond 118 couples elongated hollow member 14 to body 110 and thereby seals cavity 102 from cavity 116. In the embodiment shown in FIG. 11, bar 12 extends through opening 120 and is not directly coupled to body 110. In another embodiment, bond 118 extends into opening 120 whereby bar 12 is at least partially coupled to main body 110. Feedthrough 124 includes two spring metal flags 130 coupled to conductors 122 which make electrical contact with contacts 36 and 38 on opposing sides of sensing bar 12. Flags 130 may include a coating of solder or braze so that they may be bonded to sensor bar 12 after assembly of body 100. Feedthrough 124 also includes a sealed-off elongated hollow member (not shown) which extends into cavity 116 whereby cavity 116 may be evacuated after assembly.

Feedthrough 124 provides a redundant seal to thereby prevent process fluid from escaping from body 100. If the seal provided by sensor 10 breaks, feedthrough 124 prevents process fluid from escaping from cavity 116.

Cavity 102 has been shown as a cylindrical shape, however, any desired shape may be used such as a tapered shape with a large diameter near the process opening so that it is easy to inspect and clean. Preferably, sensor 10 is contained within cavity 102 and does not protrude so that it is protected from damage.

Figure 12A:
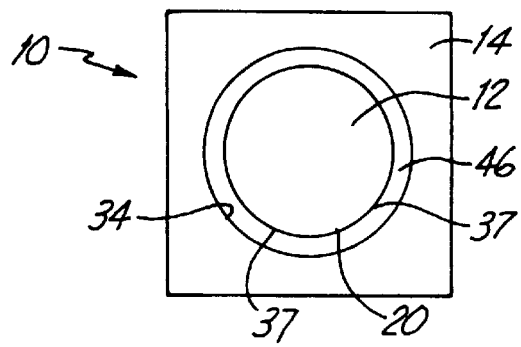
FIGS. 12A, 12B and 12C are cross-sectional views of sensors which show various aspects of the present invention.
Figure 12B:
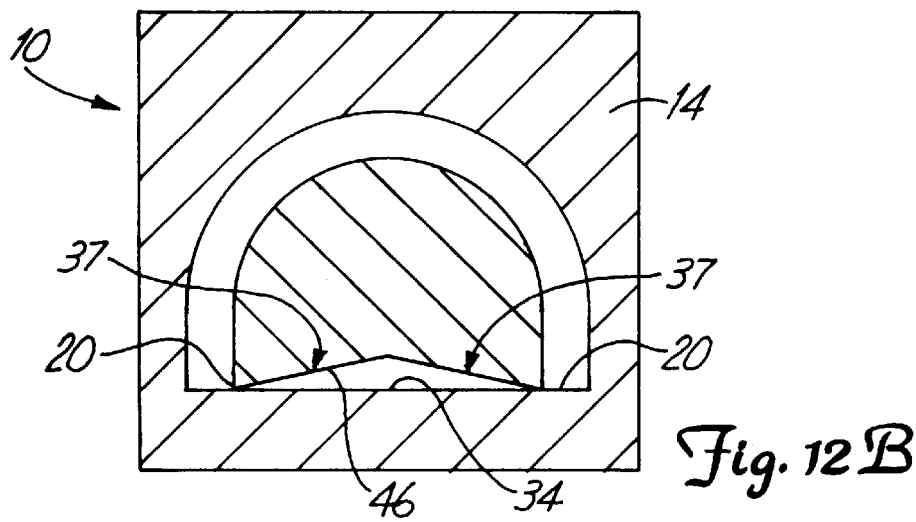
Figure 12C:
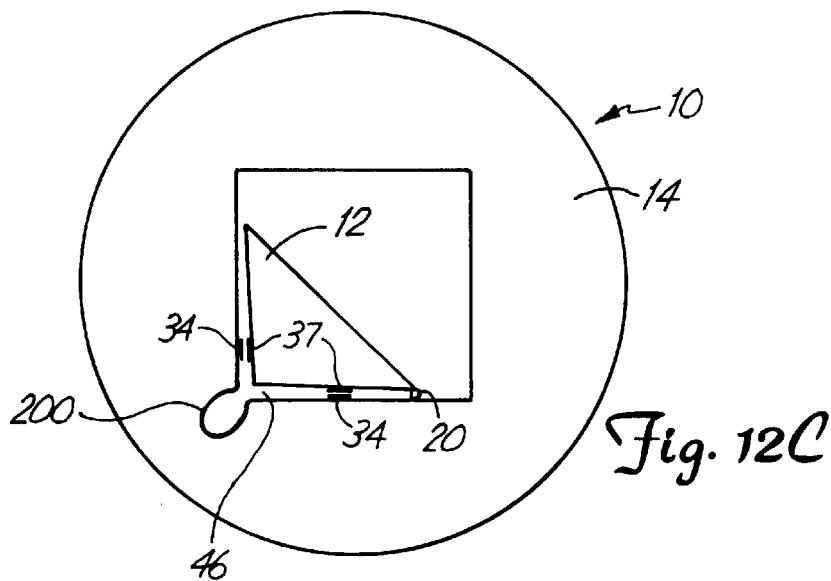

The present invention includes elongated sensors having elongated hollow members and elongated bars carried therein of any desirable shape and those shapes are not limited to the designs as specifically set forth herein. For example, FIG. 12A is a cross-sectional view of sensor 10 in which member 14 has a square outer profile and a tubular inner profile. Furthermore, another aspect of the invention includes forming member 14 and/or bar 12 out of a conductive material. In such an embodiment, separate electrodes are not required, however, bond 20 must be of an electrically insulating material unless member 14 is conductive and bar 12 is not conductive. FIG. 12B is a cross-sectional view of a sensor 10 having a square internal cavity carrying bar 12 which forms a gap 46 therebetween. FIG. 12C is a cross-sectional view of sensor 10 showing other aspects of the invention including bar 12 having a triangular shape and member 14 having a region of reduced strength 200 which acts as a hinge or pivot to thereby promote changes in the size of gap 46 when sensor 10 is exposed to external pressure. In one embodiment, it may be desired to have a single bond 20 to couple bar 12 shown in FIG. 12C which thereby allows substantial deformation without stressing or compressing bar 12.

The invention offers a number of advantages. The circular cross section is easy to fabricate and seal and may undergo over pressure exposure without damage. The electrode carried on the inner surface of the hollow elongated member may act as a shield against potential dielectric changes to the surrounding fluid which could alter capacitance values and acts to shield the sensor from stray electric fields and noise. Further, this interior electrode may be easily deposited over the entire interior surface of the elongated hollow member using known coating techniques such as chemical vapor deposition, etc. Preferably, the active portion of the electrodes is placed near the tip of the sensor to thereby provide additional stress isolation and reduce parasitic effects. The invention provides a gap which is easily fabricated to very small dimensions. This is achieved by placing a bar having a curved cross-section into the hollow cavity of the elongated hollow member whereby the curve naturally forms a small gap therebetween. As illustrated in FIGS. 3, 5, 6, 7, 12A and 12B, one aspect of the invention includes forming capacitors with narrow gaps defined by cylindrical asymmetry of part shape or eccentricity of part placement, or a combination of both asymmetry and eccentricity.

Although the present invention has been described with reference to preferred embodiments, workers skilled in the art will recognize that changes may be made in form and detail without departing from the spirit and scope of the invention.

What is claimed is:

1. A capacitive pressure sensor, comprising:
   an elongated hollow tubular member extending from an open end for receiving electrical connections to a sealed end, and having an elongated hollow member inner wall along its length deflectable by pressure;
   a bar, extending eccentrically inside the elongated hollow member and having a bar outer wall attached to the elongated hollow member inner wall along at least a portion of its length, the elongated hollow member inner and bar outer walls having shapes which form a gap therebetween deflectable with pressure; and
   an output related to deflection of the gap due to pressure applied to the elongated hollow member.

2. The capacitive pressure sensor of claim 1 wherein the elongated hollow member is substantially cylindrical in shape.

3. The capacitive pressure sensor of claim 1 wherein the bar is substantially cylindrical in shape.

4. The capacitive pressure sensor of claim 1 wherein the bar and the elongated hollow member have substantially similar shapes along their length.

5. The capacitive pressure sensor of claim 1 wherein a central axis of the bar is offset relative to a central axis of the elongated hollow member.

6. The capacitive pressure sensor of claim 1 wherein the bar has a deformed cylindrical shape.

7. The capacitive pressure sensor of claim 1 including:
   a first film conductor forming a first capacitive electrode on the elongated hollow member inner wall and a first path extending to the open end for a first electrical connection;
   a second film conductor forming a second capacitive electrode on the bar outer wall and a second path extending to the open end for a second electrical connection; and
   wherein the output comprises electrical capacitance between the first and second capacitive electrodes.

8. The capacitive pressure sensor of claim 1 including a region of reduced thickness in the elongated hollow member to promote deformation of the gap due to applied pressure.

9. The capacitive pressure sensor of claim 1 wherein the gap between the elongated hollow member inner and bar outer walls carries a reference pressure therein.

10. A pressure sensing module, comprising:
    an elongated hollow tubular pressure sensor having a process pressure sensing end that is sealed and a reference pressure sensing end that is open providing an electrical pressure sensor signal, the sensor including an elongated eccentric bar carried therein;
    an electrical feedthrough that is sealed, electrically connected to the sensor, feeding the pressure sensor signal outside the pressure sensing module; and
    a multifunction body having a chamber sealed by the electrical feedthrough and providing a reference pressure to the open sensor end, a well receiving the process pressure sensing end and opening outwardly from the module for connection to a pressurized process fluid, and a sensor passageway extending between the chamber and the well shaped to sealingly receive the pressure sensor.

11. The pressure sensor module of claim 10 wherein the shape of the sensor passageway includes a protruding shoulder engaging a portion of the open end of the pressure sensor, preventing process fluid pressure from forcing the pressure sensor into the reference well.

12. The pressure sensor of claim 10 wherein the pressure sensor includes:
   an elongated hollow member, extending from an open end for receiving electrical connections to a sealed end, and having an elongated hollow member inner wall along its length which is deflectable by pressure; and
   wherein the bar extending inside the elongated hollow member includes a bar outer wall attached to the elongated hollow member inner wall along its length.

13. The pressure sensor module of claim 12 wherein the pressure sensor further includes:
   a first film conductor forming a first capacitive electrode on the elongated hollow member inner wall and a first path extending to the open end;
   a second film conductor forming a second capacitive electrode on the bar outer wall and a second path extending to the open end for a second electrical connection; and
   wherein the first and second electrical connections provide the electrical pressure sensor signal.

14. The pressure sensor module of claim 10 including a process coupling face having the well formed therein and adapted for coupling to an industry standard process coupling.

15. The pressure sensor module of claim 10 including a joint which sealing couples the pressure sensor to the multifunction body.

16. The pressure sensor module of claim 15 including a corrosion resistant material covering the joint to thereby seal the joint from a process fluid.

17. The pressure sensor module of claim 10 wherein the multifunction body is adapted for coupling to a process control transmitter housing.

* * * * *